(12) United States Patent
Moriwaki et al.

(10) Patent No.: US 12,016,008 B2
(45) Date of Patent: Jun. 18, 2024

(54) COMMUNICATION APPARATUS, COMMUNICATION METHOD, AND COMPUTER-READABLE STORAGE MEDIUM FOR IMPLEMENTING COEXISTENCE WITH LEGACY SYSTEM

(71) Applicant: KDDI CORPORATION, Tokyo (JP)

(72) Inventors: Kazuya Moriwaki, Fujimino (JP); Takeo Ohseki, Fujimino (JP); Masaya Shibayama, Fujimino (JP); Yasuhiro Suegara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 397 days.

(21) Appl. No.: 17/343,148

(22) Filed: Jun. 9, 2021

(65) Prior Publication Data

US 2021/0298035 A1  Sep. 23, 2021

Related U.S. Application Data

(63) Continuation of application No. PCT/JP2019/039128, filed on Oct. 3, 2019.

(30) Foreign Application Priority Data

Dec. 13, 2018 (JP) ................. 2018-233648

(51) Int. Cl.
*H04W 72/12* (2023.01)
*H04L 5/00* (2006.01)
(Continued)

(52) U.S. Cl.
CPC ....... *H04W 72/1215* (2013.01); *H04L 5/0048* (2013.01); *H04W 72/0453* (2013.01); *H04W 72/541* (2023.01)

(58) Field of Classification Search
CPC ......... H04W 72/1215; H04W 72/0453; H04W 72/541; H04W 16/14; H04L 5/0048;
(Continued)

(56) References Cited

U.S. PATENT DOCUMENTS 11,638,289 B2 * 4/2023 John Wilson ......... H04L 1/0026
370/329
11,770,598 B1 * 9/2023 Zhang .................... F21V 14/06
(Continued)

FOREIGN PATENT DOCUMENTS

JP       2019-516279 A      6/2019
WO    WO 2017/173133 A1   10/2017
(Continued)

OTHER PUBLICATIONS

Ericsson, Nokia, Nokia Shanghai Bell, AT&T, "LTE-NR resource allocation coordination over X2", 3GPP TSG RAN WG3 Meeting #99 R3-181284, Feb. 26, 2018-Mar. 1, 2018, Athens, Greece, https://www.3gpp.org/ftp/tsg_ran/WG3_lu/TSGR3_99/Docs/R3-181284.zip (7 pages).

(Continued)

*Primary Examiner* — Julio R Perez
(74) *Attorney, Agent, or Firm* — Foley & Lardner LLP

(57) ABSTRACT

A communication apparatus, which is capable of performing, in a predetermined frequency band to be used by a first radio communication system configured to periodically transmit a reference signal with a predetermined frequency spacing, communication using a second radio communication system that is different from the first radio communication system, performs communication of the second radio communication system while the base station apparatus of the first radio communication system operates in a mode in which periodic transmission of the reference signal is stopped for a predetermined period, based on information (Continued)

relating to a timing at which a base station apparatus of the first radio communication system is to operate in the mode.

12 Claims, 5 Drawing Sheets

(51) Int. Cl.
*H04W 72/0453* (2023.01)
*H04W 72/541* (2023.01)

(58) Field of Classification Search
CPC ............. H04L 27/2646; H04L 5/0032; H04L 27/2602; H04L 27/26025; H04L 5/0062; Y02D 30/70
See application file for complete search history.

(56) References Cited

U.S. PATENT DOCUMENTS

| | | | | |
|---|---|---|---|---|
| 11,770,826 | B2* | 9/2023 | Zhou | H04W 72/1273 |
| | | | | 370/330 |
| 2018/0192404 | A1* | 7/2018 | Maaref | H04W 72/0453 |
| 2018/0287760 | A1 | 10/2018 | Choi et al. | |
| 2018/0367985 | A1* | 12/2018 | Novlan | H04W 56/0005 |
| 2019/0081842 | A1* | 3/2019 | Kim | H04W 76/27 |
| 2019/0089498 | A1 | 3/2019 | Pelletier et al. | |
| 2020/0228383 | A1* | 7/2020 | Kim | H04L 27/2666 |
| 2021/0076197 | A1 | 3/2021 | Novlan et al. | |
| 2021/0126753 | A1 | 4/2021 | Mochizuki et al. | |
| 2021/0368500 | A1* | 11/2021 | Centonza | H04W 72/541 |
| 2023/0164575 | A1* | 5/2023 | Ponugoti | H04W 28/16 |
| | | | | 370/328 |
| 2023/0164576 | A1* | 5/2023 | Ponugoti | H04W 72/0453 |
| | | | | 370/329 |
| 2023/0179267 | A1* | 6/2023 | Lin | H04W 16/26 |
| | | | | 375/222 |

FOREIGN PATENT DOCUMENTS

| | | |
|---|---|---|
| WO | WO-2018/231405 A1 | 12/2018 |
| WO | WO-2019/098059 A | 5/2019 |

OTHER PUBLICATIONS

Office Action issued in corresponding Japanese Patent Application No. 2022-115019 dated May 26, 2023 (7 pages).

3GPP, "3GPP TS 36.423 V15.3.0 (Sep. 2018)", 3rd Generation Partnership Project; Technical Specification Group Radio Access Network; Evolved Universal Terrestrial Radio Access Network (E-UTRAN); X2 application protocol (X2AP) (Release 15), Sep. 2018, pp. 64-68 (7 pages).

Office Action issued in corresponding Japanese Patent Application No. 2022-115019 dated Sep. 1, 2023 (4 pages).

Huawei, HiSilicon "Contents of messages for Xn and X2 interface to support LTE-NR coexistence," 3GPP TSG RAN WG1 Meeting #90, Prague, Czech Republic, Aug. 21-25, 2017 (4 pages).

JP Office Action on JP Appl. Ser. No. 2018-233648 dated Feb. 4, 2022, with translation (5 pages).

LG Electronics: "Discussion on the Xn and enhanced X2 interface messages in NR-LTE coexistence," 3GPP TSG RAN WG1 Meeting #90, Prague, Czech Republic, Aug. 21-25, 2017 (4 pages).

Qualcomm Incorporated: "NR-LTE Co-channel Coexistence Considerations," 3GPP TSG-RAN WG1 NR#2, Qingdao, P.R. China, Jun. 27-30, 2017 (5 pages).

"Revised WID on New Radio Access Technology", NTT Docomo, Inc., 3GPP TSG RAN Meeting #77 RP-172115 (revision of RP-172109), Sep. 2017, 11 pages.

"NR numerology scaling and alignment", Qualcomm Incorporated, 3GPP TSG-RAN WG1 #86 R1-166364, Aug. 2016, 5 pages <URL: http://www.3gpp.org/ftp/tsg_ran/WG1_RL1/TSGR1_390/Docs/R1-166364.zip>.

"Remaining details on synchronization signal design", Qualcomm Incorporated, 3GPP TSG RAN WG1 Meeting 90bis R1-1718526, Oct. 2017, pp. 1-8, XP051353094 Retrieved from the Internet: URL:http://www.3gpp.org/ftp/tsg ran/WGI_RL_1/TSGRI_90b/Docs/.

"Mini-slot Design and Operations in NR", AT&T, 3GPP TSG RAN1 NR Ad Hoc Meeting R1-1700321, Jan. 2016, pp. 14, XP051202800 Retrieved from the Internet: URL:http://www.3gpp.org/ftp/tsg_ran/WGI_RL_1/TSGRI AH/NR AH_1701/Docs/.

Extended European Search Report issued in corresponding European Application No. 19896909.9 dated Dec. 9, 2021.

* cited by examiner

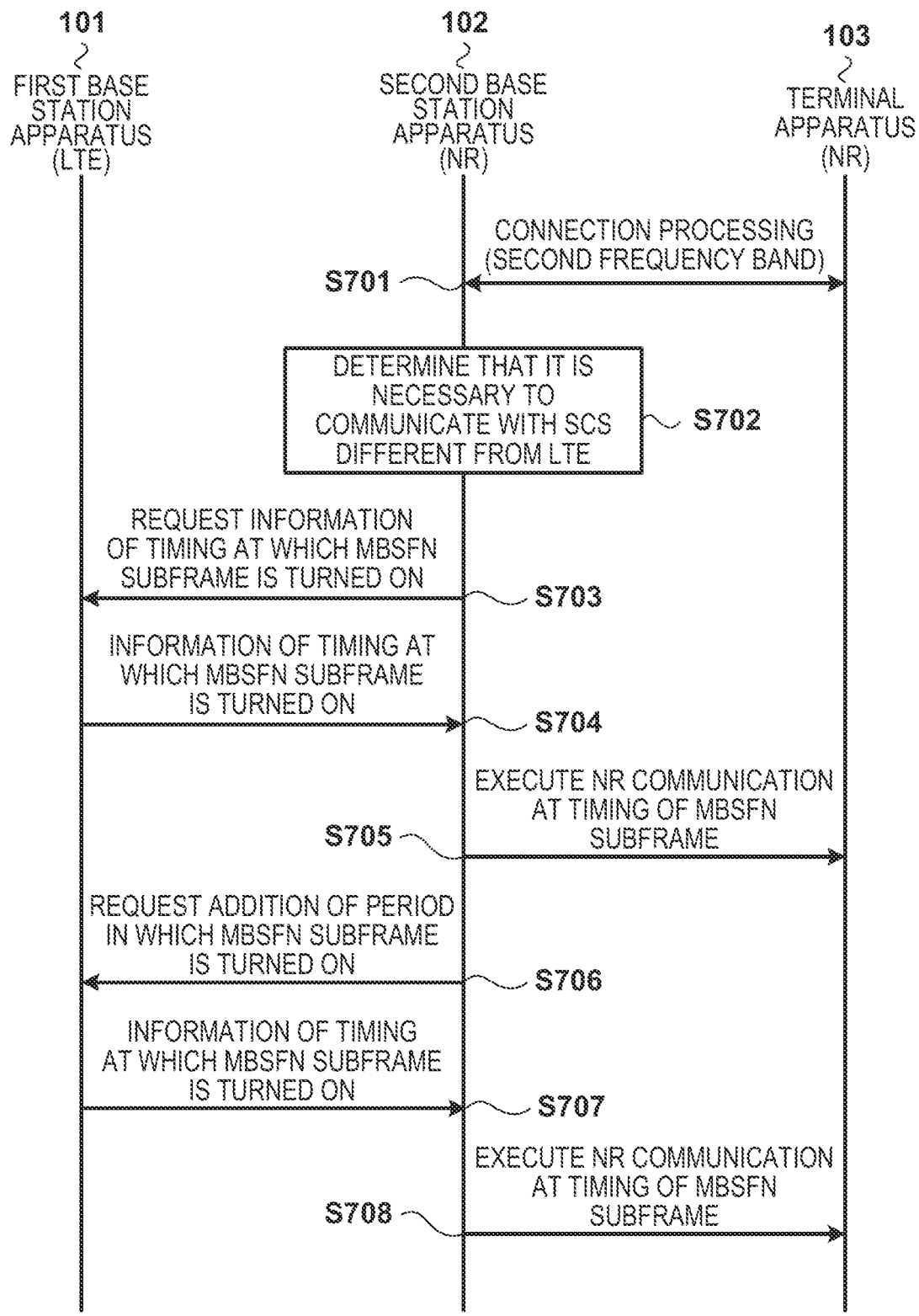

COMMUNICATION APPARATUS, COMMUNICATION METHOD, AND COMPUTER-READABLE STORAGE MEDIUM FOR IMPLEMENTING COEXISTENCE WITH LEGACY SYSTEM

CROSS-REFERENCE TO RELATED APPLICATION(S)

This application is a continuation of International Patent Application No. PCT/JP2019/039128 filed on Oct. 3, 2019, which claims priority to and the benefit of Japanese Patent Application No. 2018-233648 filed on Dec. 13, 2018, the entire disclosures of which are incorporated herein by reference.

BACKGROUND OF THE INVENTION

Field of the Invention

The present invention relates to a communication apparatus, a communication method, and a computer-readable storage medium, and specifically relates to a technique for reducing interference between radio communication systems.

Description of the Related Art

Currently, research is being conducted on New Radio Access Technology (NR) as a 5th generation cellular communication technique. In this research, research is also being conducted regarding operating NR in an existing frequency band being used by Long Term Evolution (LTE) (see NPL1).

CITATION LIST

Non-Patent Literature

NPL1: 3GPP, RP-172115, September 2017

In an environment in which LTE and NR coexist, it is important that NR does not hinder the communication of LTE, which is a previous-generation communication system. In LTE, communication is performed using an orthogonal frequency division multiplexing connection as a base and using a resource element composed of a frequency carrier and one OFDM symbol as a minimum unit of a radio resource. Also, in LTE, the resource elements in which the reference signals are arranged are dispersed in the entirety of the system band. At this time, if an NR signal uses the same frequency spacing of sub-carriers (SCS, Sub-Carrier Spacing) as LTE, interference does not occur between the LTE reference signals and the NR signals even if the LTE and NR signals are arranged in the same time. On the other hand, in NR, in order to shorten the OFDM symbol length to enable communication with a low delay, it can be envisioned that a signal with a greater SCS compared to that of LTE will be used. If the SCS of the NR signals is different from that of LTE, interference will occur if the LTE and NR signals are arranged adjacent to each other without providing a guard band. On the other hand, although interference can be avoided by arranging the NR signals and the LTE signals apart from each other using a guard band, the frequency use efficiency deteriorates.

SUMMARY OF THE INVENTION

The present invention provides a technique for reducing the influence that transmission of a signal in a second radio communication system of a new generation has on a first radio communication system of a previous generation.

A communication apparatus according to an aspect of the present invention is a communication apparatus capable of performing, in a predetermined frequency band to be used by a first radio communication system configured to periodically transmit a reference signal with a predetermined frequency spacing, communication using a second radio communication system that is different from the first radio communication system, wherein the communication apparatus is configured to perform, based on information relating to a timing at which a base station apparatus of the first radio communication system is to operate in a mode in which periodic transmission of the reference signal is stopped for a predetermined period, communication of the second radio communication system while the base station apparatus of the first radio communication system operates in the mode.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 7 is a diagram showing an example of a flow of processing to be executed by a radio communication system.

DESCRIPTION OF THE EMBODIMENTS

Figure 1:
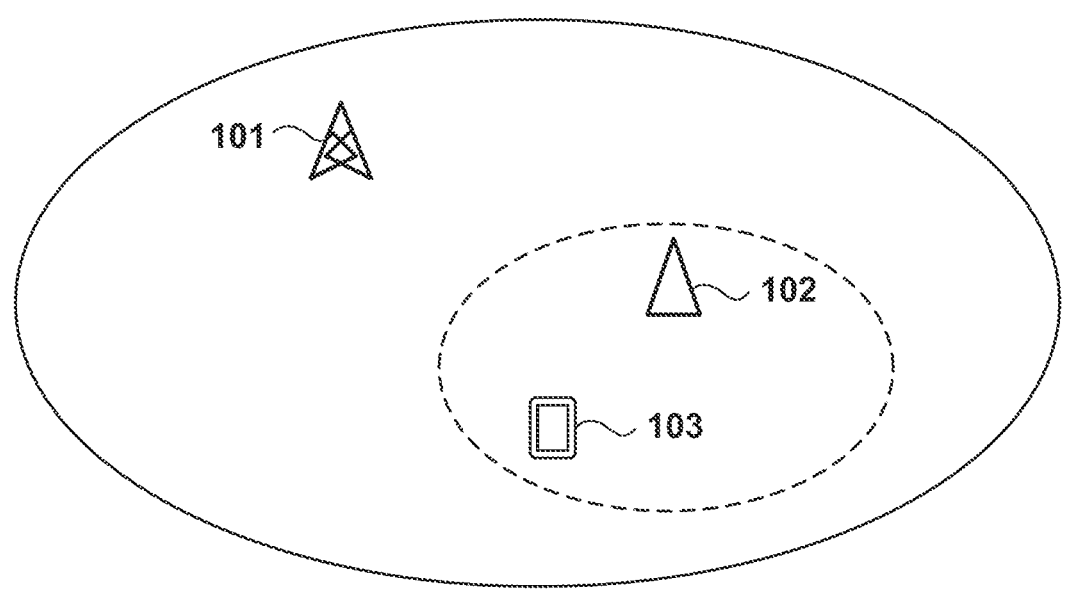
FIG. 1 is a diagram showing an exemplary configuration of a radio communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

A configuration example of a communication system according to this embodiment is shown in FIG. 1. FIG. 1 shows a first base station apparatus 101 for a first radio communication system, and a second base station apparatus 102 and a terminal apparatus 103 for a second radio communication system. The first radio communication system uses a first frequency band. In this embodiment, it is assumed that the first radio communication system conforms to the Long Term Evolution (LTE) standard, which is a 4th generation (4G) cellular communication standard. Furthermore, the second radio communication system can use a first frequency band, as well as a second frequency band that is different from the first frequency band. In this embodiment, it is assumed that the second radio communication system conforms to the New Radio Access Technology (NR) standard, which is a 5th generation (5G) cellular communication standard. That is to say, in the first frequency band, a coexistence environment is provided in which communication conforming to the NR standard is also performed while communication conforming to the LTE standard is performed. In the description below, it is assumed that the terminal apparatus 103 performs communication according to the NR standard, but the terminal apparatus 103 may perform communication through connection to the first base station apparatus 101 according to the LTE standard, in addition to or instead of the connection to the second base station apparatus 102.

It should be noted that although FIG. 1 illustrates a case in which one first base station apparatus 101 conforming to the LTE standard, and one second base station apparatus 102 and one terminal apparatus 103 conforming to the NR standard are arranged, naturally, there may be many of these apparatuses. Furthermore, although FIG. 1 illustrates a case in which a cell deployed by the first base station apparatus 101 includes a cell deployed by the second base station apparatus 102, there is no limitation to this, and it is also possible to apply a configuration in which these cells partially overlap each other. Moreover, although FIG. 1 shows the first base station apparatus 101 and the second base station apparatus 102 as different facilities that are located at different positions, these apparatuses may be located at the same position. For example, the LTE base station apparatus and the NR base station apparatus may be located side by side in one area. Furthermore, the first base station apparatus 101 and the second base station apparatus 102 form two or more beams, and can communicate with terminal apparatuses in cells (sectors) deployed by the beams.

Figure 2:
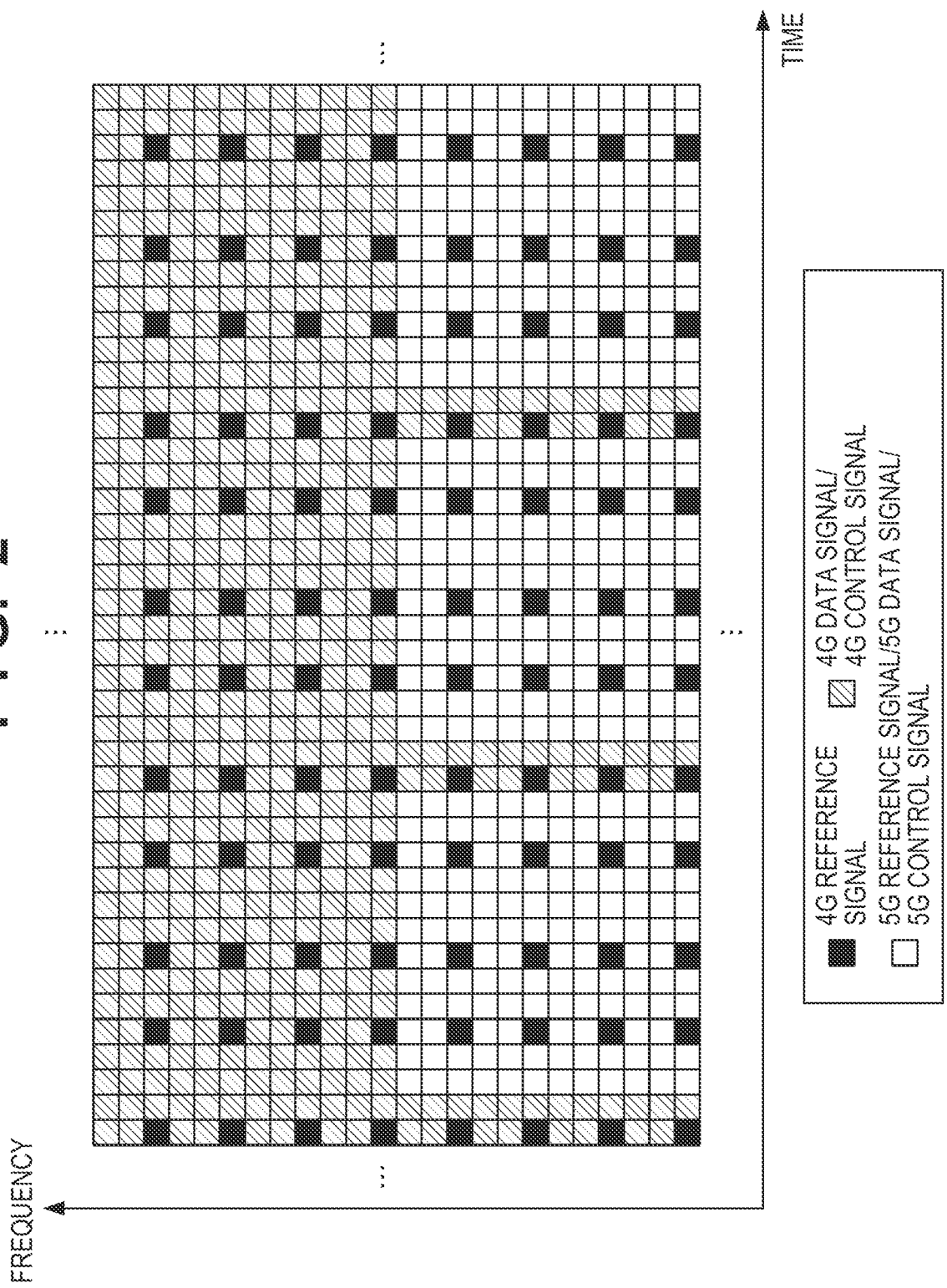
FIG. 2 is a diagram for illustrating an overview of an environment in which LTE and NR coexist.

Hereinafter, a general environment in which the LTE (4G) standard and the NR (5G) standard coexist will be described with reference to FIG. 2. In this coexistence environment, communication of LTE, which is a legacy system, is performed with priority, and communication of NR is performed using radio resources that are not being used in LTE. FIG. 2 shows resources arranged as two resource blocks in the frequency direction and three resource blocks in the time direction, for the sake of description. One rectangular region in FIG. 2 indicates 1 subcarrier×1 OFDM symbol in the LTE, and this unit is referred to as a resource element. One resource block is constituted by 12 subcarriers×7 OFDM symbols, and, in each resource block, a predetermined number of resource elements are periodically allocated at predetermined frequency positions, in order to transmit a reference signal. Furthermore, resources are allocated to a terminal apparatus in units of two resource blocks in the time direction, and a control signal corresponding to 1 to 3 OFDM symbols is allocated to this unit. Moreover, a synchronization signal is allocated in a certain period.

In LTE, a synchronization signal, a reference signal, and a control signal are transmitted even if no resource block is used for transmission of user data. In particular, the reference signals are arranged with a small frequency spacing over the entirety of the system frequency band, and are periodically transmitted in a short time interval. Here, in NR, transmission can be performed using a sub-carrier having a frequency spacing (hereinafter referred to as a first frequency spacing) that is different from that of LTE, and transmission can be performed using a sub-carrier having a frequency spacing (second frequency spacing) that is the same as that of LTE. Note that the frequency spacing of the sub-carriers corresponds to the frequency interval between the sub-carriers and is also called the SCS (Sub-Carrier Spacing). At this time, if NR communication is to be performed using sub-carriers of the second frequency spacing, it is possible to arrange the sub-carriers of the NR signals so as to be orthogonal to the sub-carriers of the LTE signals. For this reason, if the second frequency spacing is used, it is possible to prevent the NR communication from interfering with the LTE communication by performing allocation of NR radio resources so as to avoid signals such as LTE reference signals. On the other hand, if NR communication is to be performed with sub-carriers of the first frequency spacing, the orthogonality cannot be ensured between the NR signals and the LTE signals in some cases. In particular, when the symbol length is shortened in order to execute low-delay communication, the first frequency spacing becomes wider than the frequency spacing of the sub-carriers in LTE, and therefore the orthogonality of the LTE signals and the NR signals can no longer be ensured. Even in this case, it is possible to suppress NR communication from interfering with LTE communication by providing a guard band for spacing apart the LTE signals and the NR signals on the frequency axis. However, as described above, in LTE, reference signals are arranged closely on the frequency axis over the entirety of the system frequency band even when the user data is not transmitted. For this reason, when a guard band is used so as not to interfere with the reference signals, the resources by which the NR signals can be transmitted become very few in number and the frequency use efficiency of the entire system deteriorates.

In view of this, in the present embodiment, an NR communication apparatus (a second base station apparatus 102, a terminal apparatus 103, or another network node) executes NR communication based on information on the timing at which an LTE base station apparatus (a first base station apparatus 101) operates in a mode in which periodic transmission of reference signal is not performed. More specifically, based on information relating to the timing at which the LTE base station apparatus operates in a mode in which periodic transmission of the reference signal is not performed for a predetermined period, the NR communication apparatus performs NR communication while the LTE base station apparatus is operating in that mode. For example, if the second base station apparatus 102 is connected in the second frequency band to the terminal apparatus 103, which can communicate with NR in the first frequency band as well, the second base station apparatus 102 acquires information relating to the timing at which the first base station apparatus 101 operates in a mode in which a Multimedia Broadcast Single Frequency Network (MBSFN) sub-frame is turned on. If the MBSFN sub-frame turned on, the reference signals are transmitted together with the control information in the control region in that sub-frame, but the reference signals are no longer transmitted thereafter. Note that in the MBSFN sub-frame, since LTE data is transmitted in some cases, information indicating the status of resource allocation (scheduling) in the MBSFN sub-frame is acquired by the second base station apparatus 102 along with information relating to the timing at which the first base station apparatus 101 turns on the MBSFN sub-frame. The first base station apparatus 101 can operate so as to stop the transmission of the reference signal for a period of one sub-frame by operating in a mode in which, for example, the MBSFN sub-frame is turned on. Note that hereinafter, depending on the case, the first base station apparatus 101 operating in a mode in which the MBSFN sub-frame is turned on will be expressed simply as "turning on the MBSFN sub-frame". The second base station apparatus 102 can operate so as to transmit NR signals in the first frequency band in the period during which the first base station apparatus 101 has turned on the MBSFN sub-frame. Also, the terminal apparatus 103 operates so as to receive a signal transmitted in the first frequency band from the second base station apparatus 102. That is, the terminal apparatus 103 performs NR communication with radio resources in a first frequency band, which are allocated based on the information relating to the timing at which the first base station apparatus 101 turns on the MBSFN sub-frame.

Note that the second base station apparatus 102 can reference information on the timing at which the first base station apparatus 101 turns on the MBSFN sub-frame if it is necessary to transmit a signal using sub-carriers of the first frequency spacing, which is different from that of the LTE sub-carrier. For example, if the connected terminal apparatus 103 determines that it is necessary to communicate using the sub-carriers of the first frequency spacing, which is different from that of the LTE sub-carrier (e.g., if it is determined that it is necessary to perform low-delay communication), the second base station apparatus 102 can transmit a signal requesting that information to the first base station apparatus 101. In this case, the first base station apparatus 101 transmits information relating to the timing at which the MBSFN sub-frame is turned on to the second base station apparatus 102 as a response to the request signal. Also, for example, if the second base station apparatus 102 holds valid information indicating the timing at which the first base station apparatus 101 turns on the MBSFN sub-frame, the second base station apparatus 102 can use the information it holds and not transmit a signal requesting the information. This makes it possible to prevent waste of signaling resources resulting from information being needlessly transmitted and received. For example, it is assumed that the second base station apparatus 102 has received information indicating that the first base station apparatus 101 will turn on the MBSFN sub-frame in a predetermined sub-frame of each frame among a predetermined number of frames. In this case, the second base station apparatus 102 can determine that the information is valid for a predetermined number of frames from when the information is acquired, and not transmit the signal requesting the information to the first base station apparatus 101. Then, since it is known that the first base station apparatus 101 will turn on the MBSFN sub-frame in a predetermined sub-frame for each frame while the information is valid, the second base station apparatus 102 can transmit the NR signals during that period. Note that the NR signals transmitted here may be signals having the same SCS as in LTE, or may be signals having a different SCS than that of LTE. For example, if valid information is no longer held, such as a case in which a predetermined number of frame periods have elapsed, the second base station apparatus 102 can transmit a signal requesting the information to the first base station apparatus 101.

Also, the first base station apparatus 101 may report information on the timing at which the MBSFN sub-frame is to be turned on periodically to the NR base station apparatus (second base station apparatus 102), which is in an adjacency relationship. Note that this reporting may also be performed non-periodically, for example, in response to entering a state in which MBSFN sub-frame is to be used, or in response to the second base station apparatus 102 reporting that an NR terminal apparatus connected to the second base station apparatus 102 in an adjacency relationship corresponds to the first frequency band, or the like. The first base station apparatus 101 may also notify the second base station apparatus 102 of this kind of information in response to receiving a predetermined signal from the terminal apparatus 103. For example, the terminal apparatus 103 transmits information of the terminal apparatus 103 to the first base station apparatus 101 in response to a connection being established with the second base station apparatus 102 in the second frequency band (e.g., due to a signal conforming to the LTE standard being transmitted in the first frequency band). This information can be information indicating that transmission through the NR standard in the first frequency band (the frequency band used by LTE) is possible, or information such as a combination of information on usable frequency bands and usable communication standards. This information can be any information for enabling the first base station apparatus 101 to recognize that the current state is a state in which coexistence with NR in the first frequency band is to be performed in an area deployed by the first base station apparatus 101. This makes it possible for the first base station apparatus 101 to recognize that there is a possibility that NR communication will be performed in the first frequency band, and the first base station apparatus 101 can transmit information relating to the timing at which the first base station apparatus 101 operates in a mode in which the MBSFN sub-frame is turned on to the second base station apparatus 102. On the other hand, if there is no terminal apparatus that can execute NR communication in the first frequency band in a cell that is in an adjacency relationship and in which communication in the NR standard is performed, the first base station apparatus 101 may not transmit such information to the second base station apparatus 102. This makes it possible to prevent waste of signaling resources resulting from transmitting information needlessly.

As described above, although the second base station apparatus 102 acquires information relating to the timing at which the first base station apparatus 101 operates in a mode in which the MBSFN sub-frame is turned on using some method, the specific method for acquiring this information may be any method.

Also, the second base station apparatus 102 need not reference information on the timing at which the first base station apparatus 101 turns on the MBSFN sub-frame if the signal is transmitted using sub-carriers of the second frequency spacing that is equal to that of the LTE sub-carriers. This is because if the sub-carriers of the second frequency spacing are used, the orthogonality with the reference signal can be guaranteed even if communication in the first frequency band in which the reference signal for LTE is being transmitted is performed, and therefore there is no need to provide a guard band. At this time, the second base station apparatus 102 may also perform communication of a signal of the second frequency spacing at the timing at which the first base station apparatus 101 turns on the MBSFN sub-frame, or may perform communication of this signal at another timing.

Note that the second base station apparatus 102 needs to perform communication at the timing at which the first base station apparatus 101 turns on the MBSFN sub-frame if a signal is to be transmitted in the first frequency band using the sub-carriers of the first frequency spacing, which is different from that of the LTE sub-carriers. For this reason, in this case, the second base station apparatus 102 references the information relating to the timing at which the first base station apparatus 101 turns on the MBSFN sub-frame. Due to this, the second base station apparatus 102 need not needlessly reference the information on the timing at which the first base station apparatus 101 turns on the MBSFN sub-frame during communication using the sub-carriers of the second frequency spacing. For this reason, for example, it is no longer necessary to acquire the information from the first base station apparatus 101, and therefore the second base station apparatus 102 can set the signaling resources for transmission and reception of this signal to the minimum level.

Also, for example, if there is no timing at which the first base station apparatus 101 operates in a mode in which the MBSFN sub-frame is turned on, the second base station apparatus 102 can transmit a signal requesting that the first base station apparatus 101 operates in that mode. Also, for example, if the amount of radio resources for the first base station apparatus 101 to operate in the mode in which the MBSFN sub-frame is turned on is smaller than the amount of radio resources required for NR communication in the first frequency band, the second base station apparatus 102 can transmit a signal requesting that the first base station apparatus 101 increases the number of periods of operating in that mode. For example, if there is no space to allocate to communication of the NR signal in order for the first base station apparatus 101 to transmit the data in all or half of the MBSFN sub-frames, the second base station apparatus 102 can transmit a request signal for increasing the frequency of the MBSFN sub-frames. Then, the first base station apparatus 101 transmits information on a setting relating to the mode to the second base station apparatus 102. Note that the first base station apparatus 101 can newly set a timing of operating in that mode, and notify the second base station apparatus 102 of the information relating to that timing. This makes it possible for the second base station apparatus 102 to perform NR communication at the timing at which the first base station apparatus 101 turned on the MBSFN sub-frame (and did not transmit data). Note that the timing at which the MBSFN sub-frame is turned on can be determined using the first base station apparatus 101, but the second base station apparatus 102 may also include information designating the timing at which the MBSFN sub-frame is to be turned on in the above-described request. Note that the terminal apparatus 103 may also transmit the above-described request signal instead of the second base station apparatus 102.

In this manner, the second base station apparatus 102 and the terminal apparatus 103 can perform communication of NR signals in a time segment in which the LTE reference signals are not transmitted. That is, due to the first base station apparatus 101 transitioning to a mode in which, for example, the MBSFN sub-frame is turned on, the reference signals are also transmitted in the time span in which the control signals are transmitted among the radio resources for one sub-frame (corresponds to 14 resource elements in the time direction), but the reference signals are no longer transmitted in the time segment thereafter. For this reason, the second base station apparatus 102 no longer interferes with the LTE reference signals even if NR signals are transmitted using sub-carriers of an SCS that is different from that of the sub-carriers of the first base station apparatus 101.

Note that the communication between the first base station apparatus 101 and the second base station apparatus 102 are performed using, for example, an Xn interface. Also, the transmission of information from the terminal apparatus 103 to the first base station apparatus 101 can be performed using the first frequency band in accordance with the LTE standard. However, these are merely examples, and any interface or line can be used as long as transmission and reception of the above-described information is performed. Also, in the above-described example, the first base station apparatus 101 stops the periodic transmission of the reference signal for a predetermined period by turning on the MBSFN sub-frame, but there is no limitation to this. That is, it is possible to apply the discussion of the present embodiment to any system in which a base station apparatus of another system can reference information relating to the timing at which a base station apparatus in a system in which a predetermined signal is transmitted periodically and with a high frequency operates in any mode in which periodic transmission of the predetermined signal can be stopped. Note that in the above-described example, an example has been shown in which the first base station apparatus 101 provides information to the second base station apparatus 102, but the information may be stored in an apparatus other than these apparatuses, and the base station apparatuses may reference the stored information by accessing the other apparatus. That is, the acquisition and referencing of the information may be performed not through direct communication between multiple base station apparatuses.

Hereinafter, exemplary configurations of a base station apparatus and a terminal apparatus that perform the above-described processing and an example of a flow of processing to be executed will be described.

Exemplary Hardware Configuration

Figure 3:
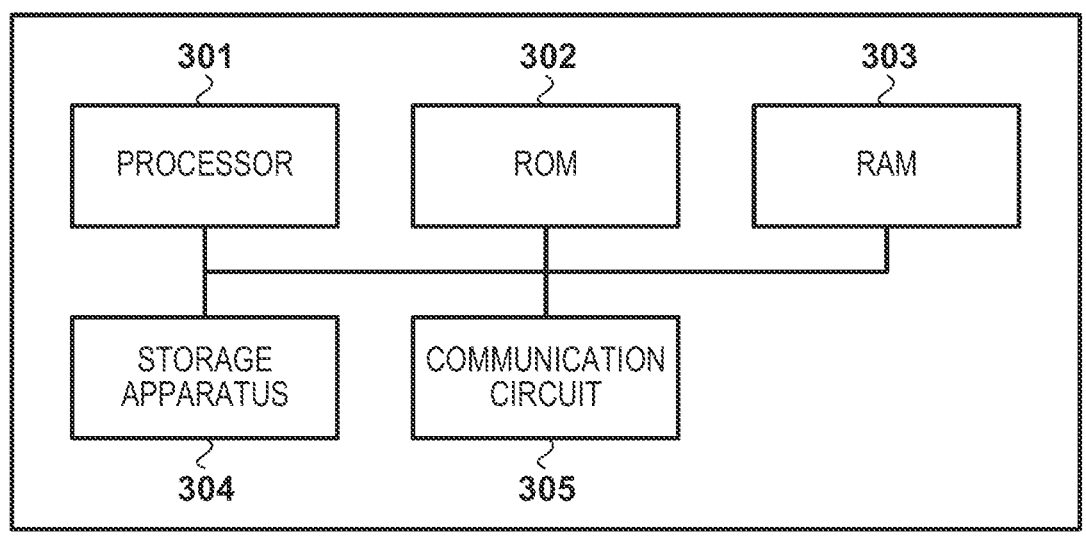
FIG. 3 is a diagram showing an exemplary hardware configuration of a communication apparatus.

FIG. 3 shows an exemplary configuration of a first base station apparatus 101, a second base station apparatus 102, and a terminal apparatus 103 (here, these apparatuses will be collectively referred to as "communication apparatuses") according to the present embodiment. In one example, the communication apparatuses each include a processor 301, a ROM 302, a RAM 303, a storage apparatus 304, and a communication circuit 305. The processor 301 is a computer that is constituted by including one or more processing circuits such as a general-purpose CPU (central processing unit) or ASIC (application-specific integrated circuit), and executes the overall processing of the communication apparatus and the above-described processing by reading out and executing a program stored in the ROM 302 and the storage apparatus 304. The ROM 302 is a read-only memory that stores information such as a program and various parameters relating to processing to be executed by the communication apparatus. The RAM 303 is a random access memory that functions as a workspace for when the processor 301 executes a program, and stores temporary information. The storage apparatus 304 is constituted by, for example, a detachable external storage apparatus or the like. The communication circuit 305 is constituted by, for example, a circuit for wired communication or wireless communication. The communication circuit 305 of the terminal apparatus 103 is constituted by including, for example, an NR base band circuit, an RF circuit, and the like, and an antenna, and is configured to be compatible with both a first frequency band for LTE and a second frequency band for NR. The terminal apparatus 103 may also include an LTE base band circuit, an RF circuit, and the like. The communication circuit 305 of the first base station apparatus 101 realizes, for example, an interface for performing (wired or wireless) communication with the second base station apparatus 102 and a wireless communication interface for LTE. Also, the communication circuit 305 of the second base station apparatus 102 realizes, for example, an interface for performing (wired or wireless) communication with the first base station apparatus 101 and an NR wireless communication interface. Note that although one communication circuit 305 is illustrated in FIG. 3, the communication apparatus can have multiple communication circuits.

Exemplary Functional Configuration

Figure 4:
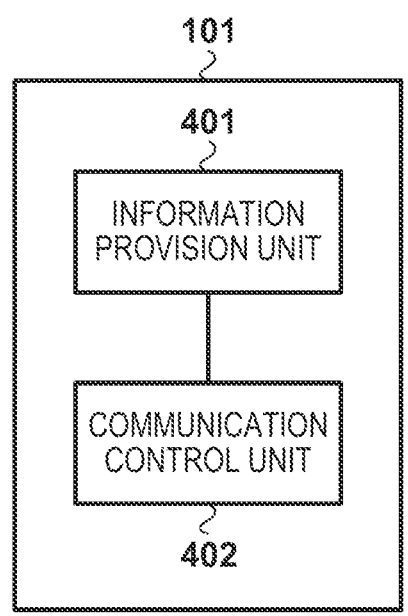
FIG. 4 is a diagram showing an exemplary functional configuration of a first base station apparatus.

FIG. 4 shows an exemplary functional configuration of the first base station apparatus 101. The first base station apparatus 101 includes, for example, an information provision unit 401 and a communication control unit 402. Note that although the first base station apparatus 101 naturally includes the functions of a general LTE base station apparatus, here, description of these functions is omitted in order to simplify the description.

For example, the information provision unit 401 provides information relating to the timing at which the first base station apparatus 101 operates in a mode in which periodic transmission of the reference signal is stopped (in one example, the MBSFN sub-frame is turned on) to another apparatus. The "other apparatus" here is, for example, the second base station apparatus 102, but may be an apparatus other than the second base station apparatus 102, such as a server on a network. For example, the information provision unit 401 can provide information designating a frame number and a sub-frame position that correspond to the timing of transitioning to a mode in which transmission of the reference signal is stopped. Also, for example, if a transition is made to a mode in which transmission of the reference signal is periodically stopped, the information provision unit 401 may also provide information indicating one timing of transitioning to that mode, and a value indicating a period. Furthermore, when a transition is made to the mode in which transmission of the reference signal is stopped, the information provision unit 401 provides information indicating whether or not there is data that is to be transmitted by the first base station apparatus 101. For example, the information provision unit 401 provides information indicating whether or not there is data that is to be transmitted by the first base station apparatus 101 at each timing at which a transition is made to a mode in which the first base station apparatus 101 stops transmission of the reference signal. This information may also designate, for example, radio resources to be used among radio resources (e.g., time and frequency resources) in a frame for which transmission of the reference signal is stopped. Accordingly, it is possible to suppress a case in which NR signals are transmitted in a format that interferes with at least data that is to be transmitted at a timing at which there is data to be transmitted. For example, the information provision unit 401 provides information to another apparatus such as the second base station apparatus 102 using an Xn interface or another interface. The information provision unit 401 can provide this information in response to the request signal being received from the second base station apparatus 102. The information provision unit 401 may also provide this information periodically. Also, the information provision unit 401 can provide information if the terminal apparatus 103 that can execute communication for the second radio communication system in the first frequency band has recognized that the terminal apparatus 103 exists in a range of cells deployed by the terminal apparatus 103. The information provision unit 401 may also provide the information if the information to be provided changes. In this manner, the information can be provided to a suitable partner apparatus at a suitable timing.

The communication control unit 402 executes communication control for operating in a method in which periodic transmission of the reference signal is stopped for a predetermined period in accordance with the information provided by at least the information provision unit 401. Note that, for example, if the second base station apparatus 102 requests that the period of operating in a mode in which the reference signal is not transmitted, or requests that such periods be increased in number, in response to that request, the communication control unit 402 determines whether or not it is possible to handle that request according to, for example, the amount of radio resources requested by the first radio communication system. Then, if it is possible to handle that request, the communication control unit 402 executes communication control so as to newly set or increase the number of periods of operating in a mode in which periodic transmission of the reference signal is stopped. Note that in this case, the information provision unit 401 can change the content of the provided information according to the periods of operating in a mode in which the periodic transmission of the reference signal is stopped, which were newly set or increased in number. For example, the communication control unit 402 can eliminate the newly set or increased periods if the demand for radio resources in the first radio communication system increases and the period of operating in the mode in which periodic transmission of the reference signal is stopped can no longer be maintained, or in response to a certain period elapsing after the periods are newly set or increased in number. This makes it possible to prevent a case in which the period of operating in the mode in which the periodic transmission of the reference signal is stopped is ensured needlessly over a long period, and to sufficiently ensure radio resources that can be used in the first radio communication system.

Figure 5:
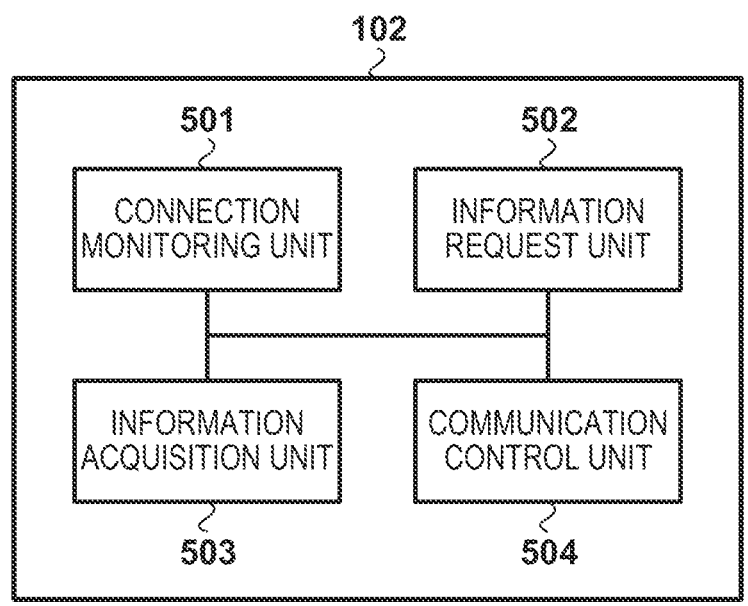
FIG. 5 is a diagram showing an exemplary functional configuration of a second base station apparatus.

FIG. 5 shows an exemplary functional configuration of the second base station apparatus 102. The second base station apparatus 102 includes, for example, a connection monitoring unit 501, an information request unit 502, an information acquisition unit 503, and a communication control unit 504. Note that although the second base station apparatus 101 naturally includes the functions of a general NR base station apparatus, here, description of these functions is omitted in order to simplify the description.

The connection monitoring unit 501 monitors whether or not there is a terminal apparatus connected to the second base station apparatus 102, whether or not the terminal apparatus can execute the communication of the second radio communication system (NR) in the first frequency band, which is used by the first radio communication system (LTE), and the communication status of the terminal apparatus. The communication status of the terminal apparatus includes, for example, information that enables determination of whether or not it is necessary to communicate with a symbol length shorter than that of LTE, such as a required delay in communication with the terminal apparatus. Also, the connection monitoring unit 501 can monitor, for example, the connection status (free space in the radio resources) in the second frequency band for NR.

In response to connection of a terminal apparatus that can execute NR communication in the first frequency band being detected by the connection monitoring unit 501, the information request unit 502 requests information relating to the timing at which the first base station apparatus 101 operates in a mode in which periodic transmission of the reference signal is stopped to another apparatus. For example, the information request unit 502 transmits a request signal requesting the information to, for example, the first base station apparatus 101 or another apparatus that manages the information. Note that the information request unit 502 does not transmit this kind of request information if valid information relating to the timing at which the first base station 101 operates in the mode in which periodic transmission of the reference signal is stopped is held in advance. If the information is provided by the first base station apparatus 101 or the other apparatus periodically or in response to detecting that there is a terminal apparatus that can execute NR communication in the first frequency band in the range of the cell of the first base station apparatus 101, the information request unit 502 may also be omitted. The information request unit 502 may also request the information if, for example, empty space in the radio resources in the second frequency band is a predetermined value or the less. This is because it is envisioned that if there is sufficient empty space in the radio resources in the second frequency band, communication with the terminal apparatus 103 can be executed in the second frequency band. The information acquisition unit 503 acquires information relating to the timing at which the first base station apparatus 101 operates in the mode in which the periodic transmission of the reference signal is stopped, the information being transmitted from the other apparatus (e.g., the first base station apparatus 101) in response to a request given by the information request unit 502, or being transmitted spontaneously from the other apparatus.

The communication control unit 504 executes NR communication with the terminal apparatus 103 in the first frequency band while the first base station apparatus 101 has stopped transmission of the reference signal. That is, the communication control unit 504 allocates some or all of the frequency resources of the first frequency band as the radio resources for transmitting the signal to the terminal apparatus 103 in the period during which the first base station apparatus 101 has stopped the transmission of the reference signal, and the communication control unit 504 transmits the NR signals with those radio resources. Note that signals other than user data can also be transmitted in at least a portion of the radio resources of the first frequency band in the period during which the first base station apparatus 101 has stopped the transmission of the reference signal.

Figure 6:
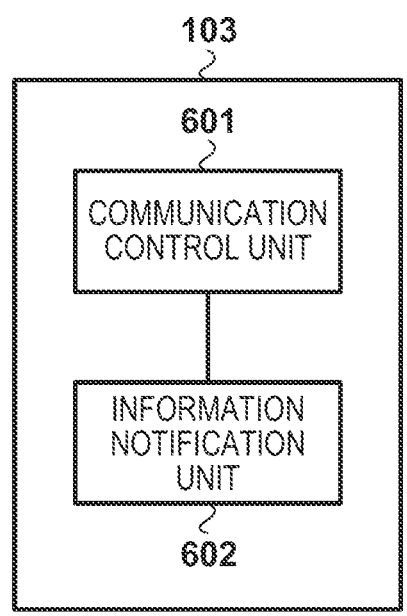
FIG. 6 is a diagram showing an exemplary functional configuration of a terminal apparatus.

FIG. 6 shows an exemplary functional configuration of the terminal apparatus 103. The terminal apparatus 103 includes, for example, a communication control unit 601, and an information notification unit 602. Note that the terminal apparatus 103 includes the functions of a terminal apparatus that can execute NR communication in not only the second frequency band allocated to NR but also the first frequency band to be used for LTE. Also, although the terminal apparatus 103 has the functions of another general terminal, here, description of these functions is omitted in order to simplify the description. The communication control unit 601 controls communication in NR with the second base station apparatus 102. Initially, the communication control unit 601 establishes communication with the second base station apparatus 102 in the second frequency band for NR, and thereafter, control for performing communication in NR also in the first frequency band based on the allocation of the radio resources can be executed by the second base station apparatus 102.

For example, in response to the communication with the second base station apparatus 102 being established in the second frequency band, the information notification unit 602 transmits, to the first base station apparatus 101, notification information that performs notification of the fact that the terminal apparatus 103 can handle NR communication in the first frequency band, or the like. For example, if the terminal apparatus 103 is connected to the first base station apparatus 101 in LTE and is connected to the second base station apparatus 102 in NR under control performed in LTE, the terminal apparatus 103 can notify the first base station apparatus 101 through communication in LTE of information indicating whether or not communication in NR is possible and whether or not the first frequency band can be used, as the capability information of the terminal apparatus 103. Note that if the second base station apparatus 102 is configured to request provision of the information to the first base station apparatus 101, the terminal apparatus 103 need not perform this kind of information notification. In this case, the terminal apparatus 103 need not include the information notification unit 602.

Flow of Processing

Next, an example of a flow of processing to be executed in the communication system will be described. Note that in the following processing example, it is assumed that the first base station apparatus 101 is an LTE base station apparatus, and executes processing for transitioning to the mode in which the MBSFN sub-frame is turned on as the processing for stopping the reference signal. However, this is merely an example, and any processing can be executed as long as it is possible to stop periodic transmission dispersed on a frequency axis of a given signal, such as a reference signal.

FIG. 7 shows an example of a flow of processing. In the present processing, upon using the second frequency band to establish a connection for NR with the terminal apparatus 103 that can handle NR communication in the first frequency band (S701), the second base station apparatus 102 determines whether or not the terminal apparatus 103 needs to communicate using sub-carriers of a frequency spacing (SCS) different from that of LTE (S702). Note that here, it is assumed that the second base station apparatus 102 has determined that sub-carriers of an SCS different from that of LTE need to be used in the communication with the terminal apparatus 103. In this case, the second base station apparatus 102 requests information relating to the timing at which the first base station apparatus 101 operates in a mode in which the periodic transmission of the reference signal is stopped to the first base station apparatus 101 (S703). Then, the second base station apparatus 102 acquires the information from the first base station apparatus 101 (S704). Thereafter, the second base station apparatus 102 transmits the NR signal to the terminal apparatus 103 based on the information notified in step S704 (S705).

Here, it is assumed that the information relating to the timing at which the first base station apparatus 101 turns on the MBSFN sub-frame is transmitted from the first base station apparatus 101 to the second base station apparatus 102. However, there is no limitation to this, and this information may also be acquired from, for example, an apparatus other than the first base station apparatus 101 and the second base station apparatus 102. Note that the information acquired here can include information indicating the timing to be used in data transmission among the timings at which the MBSFN sub-frame is turned on. Also, the second base station apparatus 102 may acquire information on a period of turning on the MBSFN frame or the like from the first base station apparatus 101, and thereafter acquire information indicating whether or not there is transmission target data for each MBSFN sub-frame (and, depending on the case, information indicating radio resources to be used by the transmission target data) each time for each MBSFN sub-frame. Also, for example, if the first base station apparatus 101 or the other apparatus is to transmit the above-described information periodically, or if the first base station apparatus 101 is to transmit the above-described information in response to the terminal apparatus 103 notifying the first base station apparatus 101 of the capability information of the terminal apparatus 103, or the like, the information provision request signal from the second base station apparatus 102 to the first base station apparatus 101 need not be transmitted.

Note that if the amount of empty radio resources of the MBSFN sub-frame is not sufficient to transmit signals by NR to the terminal apparatus 103 in the first frequency band, the second base station apparatus 102 can request addition of a period in which the MBSFN sub-frame is turned on (S706). Upon receiving this request, the first base station apparatus 101 adds a period in which the MBSFN sub-frame is turned on, and notifies the second base station apparatus 102 of the information on the timing at which the MBSFN sub-frame including the information for designating the timing corresponding to the added period is turned on (S707). Then, based on the information notified in step S707, the second base station apparatus 102 transmits the NR signal to the terminal apparatus 103 (S708). Note that even if there is no timing at which the first base station apparatus 101 turns on the NIB SFN sub-frames, a request similar to that of step S706 is transmitted, and the first base station apparatus 101 can newly set a period in which the MBSFN sub-frame is turned on and can transmit the information relating to this timing to the second base station apparatus 102. This makes it possible to, for example, ensure radio resources in the first frequency band for the terminal apparatus 103, which has a short required delay, and to transmit the signals using this radio resource.

As described above, in response to a terminal apparatus that can handle communication of the second radio communication system in a first frequency band to be used by a first radio communication system being connected to a base station apparatus of the second radio communication system, the base station apparatus of the first radio communication system notifies the base station apparatus of the second radio communication system of the timing of operation in a mode in which transmission of reference signal is stopped for a predetermined period. Then, the base station apparatus of the second radio communication system and the terminal apparatus perform communication in the first frequency band based on the notified information. This makes it possible to prevent the signals of the second radio communication system from interfering with signals such as the reference signals of the first radio communication system. As a result, it is possible to sufficiently suppress the influence that the interference of the second radio communication system has on the communication of the first radio communication system.

According to the present invention, it is possible to provide a technique for reducing the influence that transmission of a signal in a second radio communication system of a new generation has on a first radio communication system of a previous generation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus that is capable of performing, in a predetermined frequency band to be used by a first radio communication system configured to periodically transmit a reference signal with a predetermined frequency spacing, communication using a second radio communication system that is different from the first radio communication system,
wherein the communication apparatus transmits, to a base station apparatus of the first radio communication system, a signal requesting information relating to a timing at which the base station apparatus of the first radio communication system is to operate in a mode in which periodic transmission of the reference signal is stopped for a predetermined period, and acquires the information from the base station apparatus of the first radio communication system as a response to the signal, and
wherein, the communication apparatus performs, based on the information, communication of the second radio communication system while the base station apparatus of the first radio communication system operates in the mode.

2. The communication apparatus according to claim 1, wherein the first radio communication system is a communication system that complies with a long-term evolution (LTE) standard, and the second radio communication system is a communication system that complies with a New Radio Access Technology (NR) standard.

3. The communication apparatus according to claim 2, wherein the mode is a mode in which a Multimedia Broadcast Single Frequency Network (MBSFN) sub-frame is turned on, and
the predetermined period is a period corresponding to a period during which the MBSFN sub-frame is turned on.

4. The communication apparatus according to claim 1, wherein the communication apparatus performs communication in the predetermined frequency band of a signal using a sub-carrier of a first frequency spacing that is different from that of a sub-carrier to be used in communication of the first radio communication system among signals to be communicated by the second radio communication system while the base station apparatus of the first radio communication system operates in the mode, and
the communication apparatus performs communication in the predetermined frequency band of a signal using a sub-carrier of a second frequency spacing equal to that of a sub-carrier to be used in communication of the first radio communication system among signals to be communicated by the second radio communication system while the base station apparatus of the first radio communication system operates in the mode or while the base station apparatus of the first radio communication system does not operate in the mode.

5. The communication apparatus according to claim 1, wherein in the second radio communication system, if the communication apparatus detects that communication of a signal using a sub-carrier of a frequency spacing different from that of a sub-carrier to be used in communication of the first radio communication system is to be performed, the communication apparatus transmits a signal requesting the information to the base station apparatus of the first radio communication system.

6. The communication apparatus according to claim 1, wherein the communication apparatus does not transmit the signal requesting the information while the communication apparatus holds the information that is valid, and the communication apparatus transmits the signal requesting the information to the base station apparatus of the first radio communication system if the communication apparatus does not hold the information that is valid.

7. The communication apparatus according to claim 1,
wherein if there is no timing at which the base station apparatus of the first radio communication system is to operate in the mode, the communication apparatus transmits, to the base station apparatus of the first radio communication system, a signal requesting that the base station apparatus of the first radio communication system operates in the mode, and the communication apparatus receives, as the information from the base station apparatus of the first radio communication system, information relating to a setting according to which the base station apparatus of the first radio communication system operates in the mode.

8. The communication apparatus according to claim 1,
wherein if an amount of radio resources according to which the base station apparatus of the first radio communication system operates in the mode is less than an amount of radio resources required for the communication of the second radio communication system that is to be executed while the base station apparatus of the first radio communication system operates in the mode in the predetermined frequency band, the communication apparatus transmits, to the base station apparatus of the first radio communication system, a signal requesting that the period of operating in the mode is increased in number, and receives, as the information from the base station apparatus of the first radio communication system, information relating to a setting according to which the base station apparatus of the first radio communication system operates in the mode.

9. The communication apparatus according to claim 1,
wherein the communication apparatus is the base station apparatus of the second radio communication system, which can perform communication using the second radio communication system in the predetermined frequency band, and
the communication apparatus performs the communication of the second radio communication system while the base station apparatus of the first radio communication system operates in the mode.

10. The communication apparatus according to claim 1,
wherein the communication apparatus is a terminal apparatus that can perform communication using the second radio communication system in the predetermined frequency band, and
the communication apparatus performs the communication of the second radio communication system while the base station apparatus of the first radio communication system operates in the mode.

11. A communication method to be performed by a communication apparatus that is capable of performing, in a predetermined frequency band to be used by a first radio communication system configured to periodically transmit a reference signal with a predetermined frequency spacing, communication using a second radio communication system that is different from the first radio communication system, the communication method comprising:
    transmitting, to a base station apparatus of the first radio communication system, a signal requesting information relating to a timing at which the base station apparatus of the first radio communication system is to operate in a mode in which periodic transmission of the reference signal is stopped for a predetermined period;
    acquiring the information from the base station apparatus of the first radio communication system as a response to the signal; and
    performing, based on the information, communication of the second radio communication system while the base station apparatus of the first radio communication system operates in the mode.

12. A non-transitory computer readable storage medium that stores a program for causing a computer, which is included in a communication apparatus that is capable of performing, in a predetermined frequency band to be used by a first radio communication system configured to periodically transmit a reference signal with a predetermined frequency spacing, communication using a second radio communication system that is different from the first radio communication system, to:
    transmit, to a base station apparatus of the first radio communication system, a signal requesting information relating to a timing at which the base station apparatus of the first radio communication system is to operate in a mode in which periodic transmission of the reference signal is stopped for a predetermined period;
    acquire the information from the base station apparatus of the first radio communication system as a response to the signal; and
    perform, based on the information, communication of the second radio communication system while the base station apparatus of the first radio communication system operates in the mode.

* * * * *